(12) United States Patent
Parmar et al.

(10) Patent No.: US 10,641,152 B2
(45) Date of Patent: May 5, 2020

(54) CONTROL SYSTEM FOR A REDUCTANT DOSING SYSTEM

(71) Applicant: Caterpillar Inc., Peoria, IL (US)

(72) Inventors: Shivsinh Hitendrasinh Parmar, Dunlap, IL (US); Purna Chander Nalla, Peoria, IL (US); Johnathan Wingate Trundt, Peoria, IL (US); Jun Cai, Dunlap, IL (US); Brian Vincent Tranel, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 233 days.

(21) Appl. No.: 15/830,047

(22) Filed: Dec. 4, 2017

(65) Prior Publication Data
US 2019/0170035 A1  Jun. 6, 2019

(51) Int. Cl.
*F01N 3/20* (2006.01)
*F01N 9/00* (2006.01)
*B01D 53/94* (2006.01)
*F16K 37/00* (2006.01)

(52) U.S. Cl.
CPC ......... *F01N 3/208* (2013.01); *B01D 53/9418* (2013.01); *B01D 53/9431* (2013.01); *F01N 9/00* (2013.01); *F16K 37/005* (2013.01); *B01D 53/9495* (2013.01); *B01D 2251/2067* (2013.01); *B01D 2259/124* (2013.01); *F01N 2610/02* (2013.01); *F01N 2610/085* (2013.01); *F01N 2610/144* (2013.01); *F01N 2610/148* (2013.01); *F01N 2610/1453* (2013.01); *F01N 2610/1473* (2013.01); *F01N 2610/1493* (2013.01); *F01N 2900/1808* (2013.01); *F01N 2900/1824* (2013.01)

(58) Field of Classification Search
CPC .... F01N 3/208; F01N 9/00; F01N 2900/1824; F01N 2900/1808; F01N 2610/148; F01N 2610/02; F01N 2610/085; F01N 2610/1473; F01N 2610/1493; F01N 2610/1453; F01N 2610/144; B01D 53/9418; B01D 53/9431; B01D 53/9495; B01D 2259/124; B01D 2251/2067; F16K 37/005
See application file for complete search history.

(56) References Cited

U.S. PATENT DOCUMENTS 6,273,120 B1 * 8/2001 Hofmann ........... B01D 53/8631
                                                      137/98
7,775,036 B2 * 8/2010 Barcin ................... B01D 53/79
                                                      60/286

(Continued)

FOREIGN PATENT DOCUMENTS

WO       2016144692       8/2005

*Primary Examiner* — Jessica Cahill
*Assistant Examiner* — Patrick C Williams

(57) ABSTRACT

A control system is provided to a reductant dosing system for actively maintaining the reductant dosing system ready for use by flushing unused reductant that has crystallized at a return valve of the reductant dosing system. The control system includes a controller that can control a manner of operation of specific system hardware that is present in the reductant dosing system to flush the unused reductant from the return valve that could otherwise cause the return valve to remain a flow-blocking condition as a result of the crystallized reductant.

16 Claims, 3 Drawing Sheets

(56) References Cited

U.S. PATENT DOCUMENTS

| | | | |
|---|---|---|---|
| 8,176,726 B2* | 5/2012 | Gerlach | B01D 53/90 60/277 |
| 8,393,142 B2* | 3/2013 | Mupparapu | F01N 3/2066 137/565.01 |
| 8,459,012 B2 | 6/2013 | Sun et al. | |
| 8,931,259 B2 | 1/2015 | Yan et al. | |
| 9,255,512 B2 | 2/2016 | Huang et al. | |
| 2008/0034733 A1 | 2/2008 | Miller et al. | |
| 2013/0000743 A1 | 1/2013 | Crary | |
| 2013/0031890 A1* | 2/2013 | Shovels | F01N 3/208 60/274 |
| 2015/0096287 A1* | 4/2015 | Qi | F01M 3/208 60/286 |
| 2016/0040575 A1 | 2/2016 | Zhang et al. | |
| 2016/0108789 A1* | 4/2016 | Mitchell | F01N 3/225 60/602 |

* cited by examiner

CONTROL SYSTEM FOR A REDUCTANT DOSING SYSTEM

TECHNICAL FIELD

The present disclosure generally relates to a reductant dosing system. More particularly, the present disclosure relates to a control system for actively maintaining a reductant dosing system ready for use by flushing unused reductant that has crystallized at a return valve of the reductant dosing system.

BACKGROUND

Various reductant fluid delivery systems are known and used in engine applications. In known reductant fluid delivery systems, a reservoir is installed onto a vehicle for containing a supply of the reductant fluid. A pump typically draws the reductant fluid from the reservoir for delivering the drawn reductant fluid to an exhaust after-treatment system downstream of the engine. During operation of the reductant delivery system, unused reductant may be routed back to the reservoir via one or more return lines. It may be advantageous to include a return valve in such a return line so that the return valve can be operated to selectively allow fluid to return to the reservoir when desired.

In some cases, the reductant may be a fluid, for example, an aqueous solution of urea that may have a tendency to crystallize at orifices of the return valve thereby increasing the return valve's susceptibility to clogging. Clogging of the return valve may consequently hamper a flow of unused reductant back into the reservoir and disrupt an otherwise stable operation of the reductant dosing system. However, in extreme cases, excessive pressure build-up could occur upstream of the clogged return valve and such excessive pressure build-up could cause one or more hardware components associated with the reductant fluid delivery system, for example, fluid lines to fail.

PCT Publication WO 2016/144692 thereinafter referred to as "the '692 publication") discloses a system for purging an exhaust reductant delivery system. However, a manner of working associated with the system of the '692 publication may not be adequately effective in removing crystallized reductant from the valves of the exhaust reductant delivery system. Due to excessive pressure build-up, upstream of the return valves when clogged, known purging systems may continue to render the exhaust reductant delivery system prone to frequent failure and subsequent downtimes owing to maintenance that may be required to bring the exhaust reductant delivery system into operation.

Hence, there is a need for a control system that improves the reliability of a reductant dosing system for use in operation.

SUMMARY OF THE DISCLOSURE

In an aspect of this disclosure, a control system is provided for a reductant dosing system having a reductant supply circuit and an air supply circuit. The control system includes a controller that is disposed in communication with a pump, a return valve, a first pressure sensor in a reductant supply line of the reductant supply circuit, and a second pressure sensor in an air supply valve of the air supply circuit. The controller obtains pressure values in the reductant supply line and the air supply line from the first pressure sensor and the second pressure sensor respectively. The controller compares the pressure in the reductant supply line with the pressure in the air supply line. The controller then closes the air supply valve and open the return valve, and determines whether the pressure in the reductant supply line is greater than a first pre-defined value, if so, the controller closes the air supply valve and a mixing chamber of a reductant dosing injector. The controller then issues commands to commence operation of the pump. Upon lapse of a first pre-determined amount of time, the controller opens the air supply valve. Upon lapse of a second pre-determined amount of time, the controller discontinues operation of the pump and cycles the return valve between its open and closed states while continuing to supply compressed air into the reductant supply line via the opened air supply valve until the pressure in the reductant supply line recedes to a value less than a second pre-defined value, the second pre-defined value being less than the first pre-defined value.

In another aspect of the present disclosure, a reductant dosing system includes a first reservoir that stores reductant therein. A pump is fluidly coupled to the first reservoir via a first reductant supply line, and a reductant dosing injector is disposed in fluid communication with the pump. A first pressure sensor is configured to output a value indicative of pressure in the first reductant supply line. The reductant dosing system also includes a return valve disposed in a return line that is positioned between the pump and the reductant dosing injector. A supply of pressurized air is connected to the reductant dosing injector via an air supply line, and an air supply valve disposed in the air supply line is configured to selectively allow flow of air from the source to the reductant dosing injector. A second pressure sensor is configured to output a value indicative of pressure in the air supply line. A controller is disposed in communication with the pump, the first pressure sensor, the second pressure sensor, the return valve, and the air supply valve. The controller is configured to perform functions set forth herein.

In yet another aspect of the present disclosure, a method for flushing a return valve associated with a reductant supply circuit of a reductant dosing system is provided. The method includes obtaining, using a first pressure sensor, a value of pressure in a reductant supply line of the reductant supply circuit. The method further includes obtaining, using a second pressure sensor, a value of pressure in an air supply line of the air supply circuit. The method then includes determining, using a controller communicably coupled to the first and second pressure sensors, whether the air supply line and the reductant supply line are hermetically sealed based on a comparison of the pressure in the reductant supply line with the pressure in the air supply line. The method then includes determining, by the controller, whether the return valve is blocked by opening the return valve and determining whether the pressure in the reductant supply line remains greater than a first pre-defined value. The method then includes operating, by the controller, a pump disposed in the reductant supply line in response to a confirmation by the controller that the return valve is blocked. The method further includes opening the air supply valve, by the controller, upon lapse of a first pre-determined amount of time from commencement of operation of the pump. The method then includes discontinuing operation of the pump, by the controller, upon lapse of a second pre-determined amount of time from commencement of operation of the pump. Further, the method also includes cyclically moving the return valve between its open and closed states, by the controller, while continuing to supply compressed air into the reductant supply line until the pressure in the reductant supply line recedes to a value less than a second pre-defined value, the second pre-defined value being less than the first pre-defined value.

Other features and aspects of this disclosure will be apparent from the following description and the accompanying drawings.

DETAILED DESCRIPTION

Figure 1:
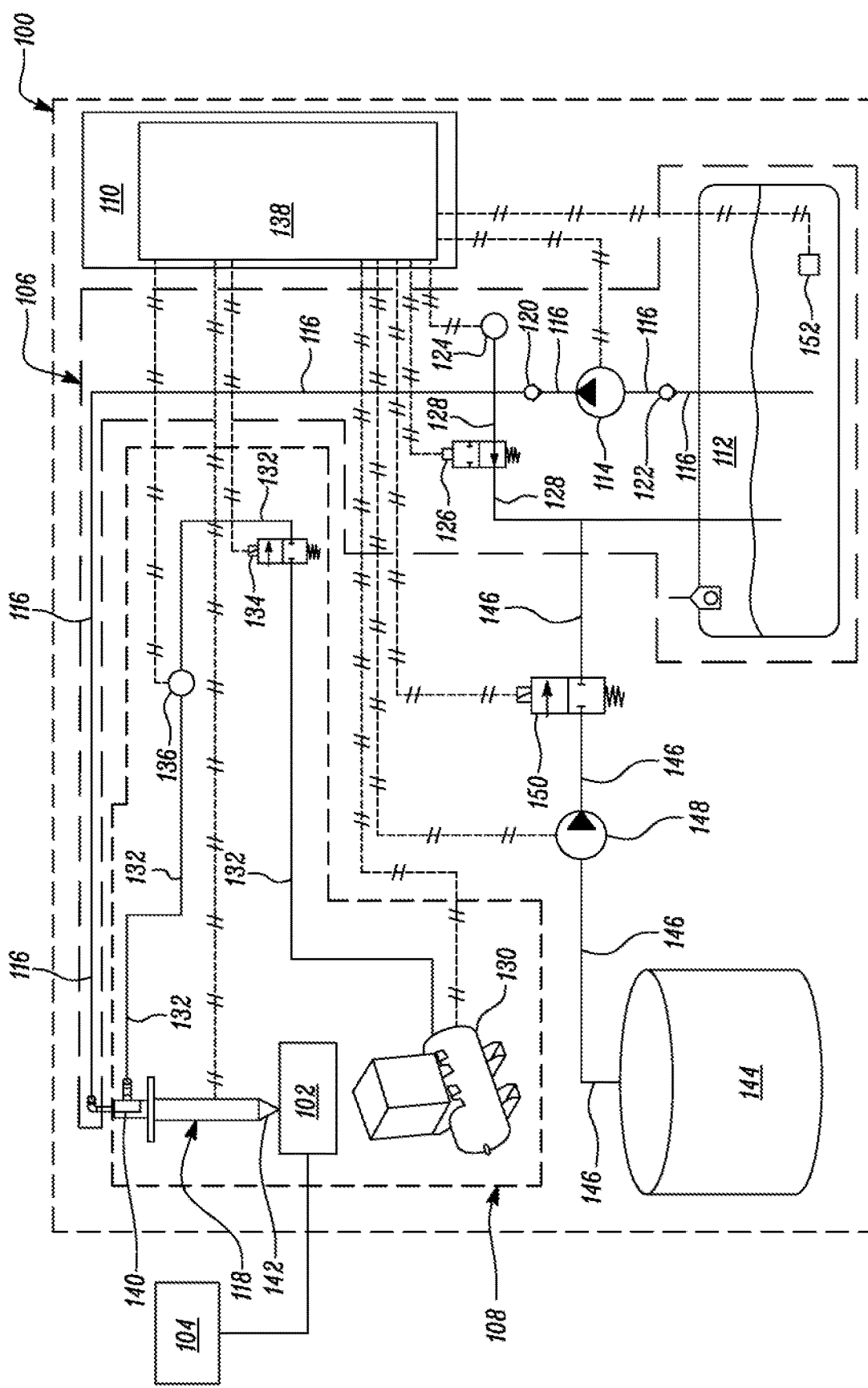
FIG. 1 is a schematic illustration of a reductant dosing system that is coupled to an exhaust after-treatment system, in accordance with an embodiment of the present disclosure.

With reference to FIG. 1, a reductant dosing system 100 is depicted, in accordance with an embodiment of the present disclosure. The reductant dosing system 100 is connected to an exhaust after-treatment system 102 for an engine 104. The engine 104 may be a Compression Ignition (CI) engine, for example, a diesel engine that may be located onboard a vehicle or form part of a stationary power machine such as a generator set. However, in alternative embodiments, the engine 104 may be embodied as a Spark ignition (SI) engine in lieu of the CI engine depending on specific requirements of an application.

The exhaust after-treatment system 102 is configured to receive a passage of exhaust stream leaving the engine 104. The exhaust after-treatment system 102 may include a Selective Catalyst Reduction (SCR) system that is configured to receive a flow of reductant from the reductant dosing system 100. The reductant disclosed herein may include, for example, an aqueous solution of Urea.

As shown in FIG. 1, the reductant dosing system 100 includes a reductant supply circuit 106, an air supply circuit 108, and a control system 110. The reductant supply circuit 106 includes a first reservoir 112 that is configured to store a first volume of reductant. The reductant supply circuit 106 also includes a pump 114 that is located downstream of the first reservoir 112 and fluidly coupled to the first reservoir 112 via a first reductant supply line 116. A reductant dosing injector 118 is located downstream of the pump 114.

Moreover, as shown in the illustrated embodiment of FIG. 1, a first check valve 120 is disposed in the first reductant supply line 116 and located between the pump 114 and the reductant dosing injector 118. The first check valve 120 is configured to allow a unidirectional flow of reductant from the pump 114 to the reductant dosing injector 118. Further, the reductant supply circuit 106 additionally includes a second check valve 122 that is disposed in the first reductant supply line 116 and located between the first reservoir 112 and the pump 114. The second check valve 122 is configured to allow a unidirectional flow of reductant from the first reservoir 112 to the pump 114.

Further, a first pressure sensor 124 is disposed in the first reductant supply line 116 between the first check valve 120 and the reductant dosing injector 118. The first pressure sensor 124 is configured to output a value that is indicative of an amount of pressure in the first reductant supply line 116 between the first check valve 120 and the reductant dosing injector 118.

Furthermore, a return valve 126 is disposed in a return line 128 that is configured to branch-off from a point on the first reductant supply line 116 located between the first check valve 120 and the reductant dosing injector 118. This return line 128 is configured to extend downstream of the return valve 126 and fluidly couple with the first reservoir 112 that is located downstream of the return valve 126.

The air supply circuit 108 includes a source 130 that is configured to provide a supply of pressurized air to the reductant dosing injector 118 via an air supply line 132. The air supply circuit 108 also includes an air supply valve 134 that is disposed in the air supply line 132 and located downstream of the source 130. This air supply valve 134 is configured to operatively allow a unidirectional flow of air from the source 130 to the reductant dosing injector 118.

Moreover, a second pressure sensor 136 is disposed in the air supply line 132 and located between the air supply valve 134 and the reductant dosing injector 118. The second pressure sensor 136 is configured to output a value that is indicative of an amount of pressure in the air supply line 132 between the air supply valve 134 and the reductant dosing injector 118.

The control system 110 includes a controller 138 that is communicably coupled to each of the pump 114, the first pressure sensor 124, the second pressure sensor 136, the air source 130, the air supply valve 134, the return valve 126, a transfer pump 148 and a reductant transfer valve 150 which are described later herein. It may be noted that each of the return valve 126, the air supply valve 134, and the reductant transfer valve 150 is an electromechanically actuated one-way two-position valve.

The control system 110 of the present disclosure could include various software and/or hardware components that are configured to perform functions consistent with the present disclosure. Moreover, the control system 110 disclosed herein may be a stand-alone control system or may be configured to co-operate with an existing electronic control module (ECU) (not shown) of a machine, for instance, an engine located onboard a vehicle. Further, the control system 110 may embody a single microprocessor or multiple microprocessors that include components for selectively and independently actuating specific system hardware associated with the reductant dosing system 100.

The reductant dosing system 100 may additionally include a second reservoir 144 fluidly coupled to the return line 128 with the help of a second reductant supply line 146. As shown in the illustrated embodiment of FIG. 1, the second reductant supply line 146 is connected to the return line 128 at a point located downstream of the return valve 126 i.e., the second reductant supply line 146 is connected to a portion of the return line 128 that is located between the return valve 126 and the first reservoir 112.

The transfer pump 148 is disposed in the second reductant supply line 146 and is configured to output pressurized flow of reductant from the second reservoir 144 into the second reductant supply line 146. Further, a reductant transfer valve 150 is disposed in the second reductant supply line 146 and located between the transfer pump 148 and the return line 128. Moreover, a fluid level sensor 152 is disposed in the first reservoir 112 and communicably coupled to the controller 138. The fluid level sensor 152 is configured to output a signal indicative of an amount of reductant present in the first reservoir 112 to the controller 138.

The present disclosure will now describe an operation of the reductant dosing system 100 prior to use of the reductant dosing system 100 in which reductant may be injected into the exhaust after-treatment system 102 or when the engine 104 is idling and reductant may not be required to treat exhaust gases in the exhaust after-treatment system 102. In an embodiment, the controller 138 may determine from the signal output by the fluid level sensor 152 whether a level of reductant present in the first reservoir 112 is below a first pre-defined threshold. If the controller 138 determines from the signal output by the fluid level sensor 152 that the level of reductant present in the first reservoir 112 is below the first pre-defined threshold, the controller 138 opens the reductant transfer valve 150 and actuates operation of the transfer pump 148 to supply reductant from the second reservoir 144 to the first reservoir 112. The transfer pump 148 and the reductant transfer valve 150 remain actuated until the level of reductant in the first reservoir 112 increases to a value that is equal to the first pre-defined threshold, or until the amount of reductant in the first reservoir 112 increases to a value that is equal to a second pre-defined threshold that is greater than the first pre-defined threshold. This way, the controller 138 ensures that adequate amount of reductant fluid is present in the first reservoir 112.

The controller 138 determines whether the return valve 126 is blocked by any unused and crystallized reductant, as will be described below. If the controller 138 determines that the return valve 126 is blocked, then the controller 138 issues command signals to various hardware components of the reductant dosing system 100 to enter a flush mode of operation, as will also be described below, in which various hardware components of the reductant dosing system 100 are configured to perform functions for operatively flushing the unused and crystallized reductant and rendering the return valve 126 free from the unused and crystallized reductant so that unused reductant fluid, if any, in the return line 128 upstream of the return valve 126 and the first reductant supply line 116 between the first check valve 120 and the reductant dosing injector 118 can flow past the return valve 126 when the return valve 126 is commanded by the controller 138 to move into its open position in a subsequent operational state of the reductant dosing system 100.

The controller 138 issues commands to the pump 114 so that the pump 114 is rendered in its non-operational mode. The controller 138 also issues commands to the reductant dosing injector 118 for maintaining the mixing chamber 140 of the reductant dosing injector 118 in its open position. Further, the controller 138 issues commands to the return valve 126 to be moved into a closed position. The controller 138 then actuates the air supply valve 134 to open and initiates an operation of the air source 130 so that the air source 130 operatively delivers a flow of compressed air into the mixing chamber 140 of the reductant dosing injector 118 via the air supply line 132 and the opened air supply valve 134.

The controller 138 determines an amount of pressure in the air supply line 132 from the second pressure sensor 136. Upon obtaining the amount of pressure in the air supply line 132 from the second pressure sensor 136, the controller 138, is configured to determine an amount of pressure in the first reductant supply line 116 from the first pressure sensor 136. It may be noted that when the mixing chamber 140 of the reductant dosing injector 118 is in its open position, the flow of pressurized air from the air supply line 132 downstream of the air supply valve 134 is also communicated into the first reductant supply line 116 via the opened mixing chamber 140 of the reductant dosing injector 118.

The controller 138 is configured to compare the pressure in the reductant supply line 116 with the pressure in the air supply line 132. In a first scenario, upon comparing the pressure in the reductant supply line 116 with the pressure in the air supply line 132, the controller 138 may be configured to determine whether the pressure in the reductant supply line 116 and the pressure in the air supply line 132 are equal. In this manner, the controller 138 may determine that no leakage is occurring across the air supply line 132, the first reductant supply line 116, and the reductant dosing injector 118 and therefore, confirm that the air supply line 132 and the first reductant supply line 116 are hermetically sealed with the mixing chamber 140 of the reductant dosing injector 118.

In a second scenario, the controller 138 may compare the pressure in the first reductant supply line 116 with the pressure in the air supply line 132 to determine whether the pressure in the first reductant supply line 116 lies within a pre-determined range of difference with the amount of pressure in the air supply line 132. The controller 138 may do so to confirm that the air supply line 132 and the first reductant supply line 116 are hermetically sealed with the mixing chamber 140 of the reductant dosing injector 118 while accounting for pressure drops, if any, with the air and reductant supply lines 132, 116 by implementing the pre-determined range of difference which may be provided beforehand to the controller 138. For example, a piping pressure loss may be associated with the air and reductant supply lines 132, 116 or pressure losses could occur across various other components present along the air and reductant supply lines 132, 116 that may give rise to a nominal difference between the pressures in the air supply line 132 and the first reductant supply line 116 respectively.

If the pressure in the first reductant supply line 116 is equal to, or lies within the pre-determined range of difference with, the pressure in the air supply line 132, then the controller 138 confirms that the air supply line 132 and the first reductant supply line 116 are hermetically sealed with the mixing chamber 140 of the reductant dosing injector 118 i.e., the first reductant supply line 116 and the air supply line 132 are capable of delivering reductant and air respectively to the mixing chamber 140 of the reductant dosing injector 118 without leakage. Upon confirming that the air supply line 132 and the first reductant supply line 116 are hermetically sealed, the controller 138 is configured to command the air supply valve 134 to move into its closed position and the reductant dosing injector 118 to close the mixing chamber 140 therein.

The controller 138 is then configured to open the return valve 126 and determine whether the pressure associated with the first reductant supply line 116 recedes below a first pre-defined value, if the controller 138 determines that the pressure associated with the first reductant supply line 116 does not recede below the first pre-defined value, then the controller 138 confirms that the return valve 126 is blocked.

Upon confirming that the return valve 126 is blocked, the reductant dosing system 100 enters a flushing state of operation in which the controller 138 is configured to operate the pump 114 to further increase the amount of pressure in the first reductant supply line 116 and the return line 128 upstream of the return valve 126. Upon lapse of a first pre-determined amount of time from commencement of operation of the pump 114, the controller 138 is configured to open the air supply valve 134 and the mixing chamber 140 of the reductant dosing injector 118 to allow a flow of compressed air from the air supply line 132 to flow into the first reductant supply line 116 via the mixing chamber 140 of the reductant dosing injector 140. This supply of air into the first reductant supply line 116 is initiated while the pump continues to deliver pressurized reductant from the first reservoir 112 into the first reductant supply line 116 to further increase the amount of pressure in the first reductant supply line 116 and the return line 128 upstream of the return valve 126.

Upon lapse of a second pre-determined amount of time from commencement of operation of the pump 114, the controller 138 is configured to discontinue operation of the pump 114 while the air supply valve 134 and mixing chamber 140 of the reductant dosing injector 118, that were opened upon lapse of the first pre-determined amount of time, continue to operatively allow the compressed air from the air supply line 132 to flow into the first reductant supply line 116. For purposes of this disclosure, as the first and second pre-determined amounts of time were initiated at the same instant of time i.e., when operation of the pump was commenced, the second pre-determined amount of time disclosed herein should be regarded as being inclusive of and greater than the first pre-determined amount of time.

Also, upon lapse of the second pre-determined amount of time, the controller 138 is configured to cycle the return valve 126 between its open and closed positions while allowing compressed air from the air source 130 to bypass a nozzle 142 of the reductant dosing injector 118 and flow into the first reductant supply line 116 via the opened air supply valve 134 and the opened mixing chamber 140 of the reductant dosing injector 118 until the controller 138 determines from the first pressure sensor 124 that the pressure in the first reductant supply line 116 recedes to a value less than a second pre-defined value, the second pre-defined value being less than the first pre-defined value.

In embodiments herein, it is envisioned that orifices not shown) of the return valve 126 could be blocked at some stage of operation of the reductant dosing system 100, owing to a tendency of unused reductant to crystallize, for instance, when water from unused reductant comes into contact with air and evaporates to leave dehydrated and crystallized reductant behind. With implementation of the control system 110 disclosed herein, this crystallized reductant may be wetted by operating the pump 114 and supplying reductant fluid from the first reservoir 112 into the return line 128 upstream of the return valve 124. As disclosed earlier herein, the pump 114 is operated until the second pre-determined amount of time lapses.

Meanwhile, when the first pre-determined amount of time lapses, the controller 138 is configured to open the air supply valve 134 and allow the compressed air from the air source 130 to flow into the first reductant supply line 116 for further increasing the amount of pressure in the first reductant supply line 116 and the return line 128 upstream of the return valve 126. Therefore, it may be noted that when the first pre-determined amount of time lapses, the amount of pressure in the first reductant supply line 116 and the return line 128 upstream of the return valve 126 is being increased with the help of the compressed air alone.

Upon lapse of the second pre-determined amount of time, the controller 138 is configured to discontinue operation of the pump 114 while continuing to maintain the air supply valve 134 and the mixing chamber 140 of the reductant dosing injector 118 in their respective open positions. Moreover, the controller 138 is also configured to cycle the return valve 126 to move between its open and closed positions so that the unused and crystallized reductant may be flushed out of the orifices associated with the return valve 126 and therefore, render the orifices of the return valve 126 to remain five from blockage.

The controller 138 determines that the orifices of the return valve 126 are rendered free from blockage when the amount of pressure in the first reductant supply line 116 and the return line 128 upstream of the return valve 126 recedes to a value less than the second pre-defined value, the second pre-defined value being less than the first pre-defined value. This way, the controller 138 may ensure that when the reductant dosing system 100 is operated for injection of reductant into the exhaust after-treatment system 102, the orifices of the return valve 126 are indeed open when the return valve 126 is moved into its open state so that any unused reductant from the first reductant supply line 116 downstream of the first check valve 120 may be routed to the first reservoir 112 via the return line 128.

The first and second pre-defined values of pressure disclosed herein, may be selected suitably after taking into account various factors including, but not limited to, a pump output pressure, an injection pressure, a maximum amount of pressure that hardware associated with the first reductant supply line 116 is capable of withstanding, and other factors depending on specific requirements of a reductant dosing application. For example, if the output pressure of the pump 114 is 75 kilo-Pascals (kPA) and the maximum amount of pressure that the hardware associated with the first reductant supply fine 116 is capable of withstanding in operation is about 200 kPA, then the first pre-defined value and the second pre-defined value may be set at the controller 138 to 100 kPA and 65 kPA respectively.

Figure 2A:
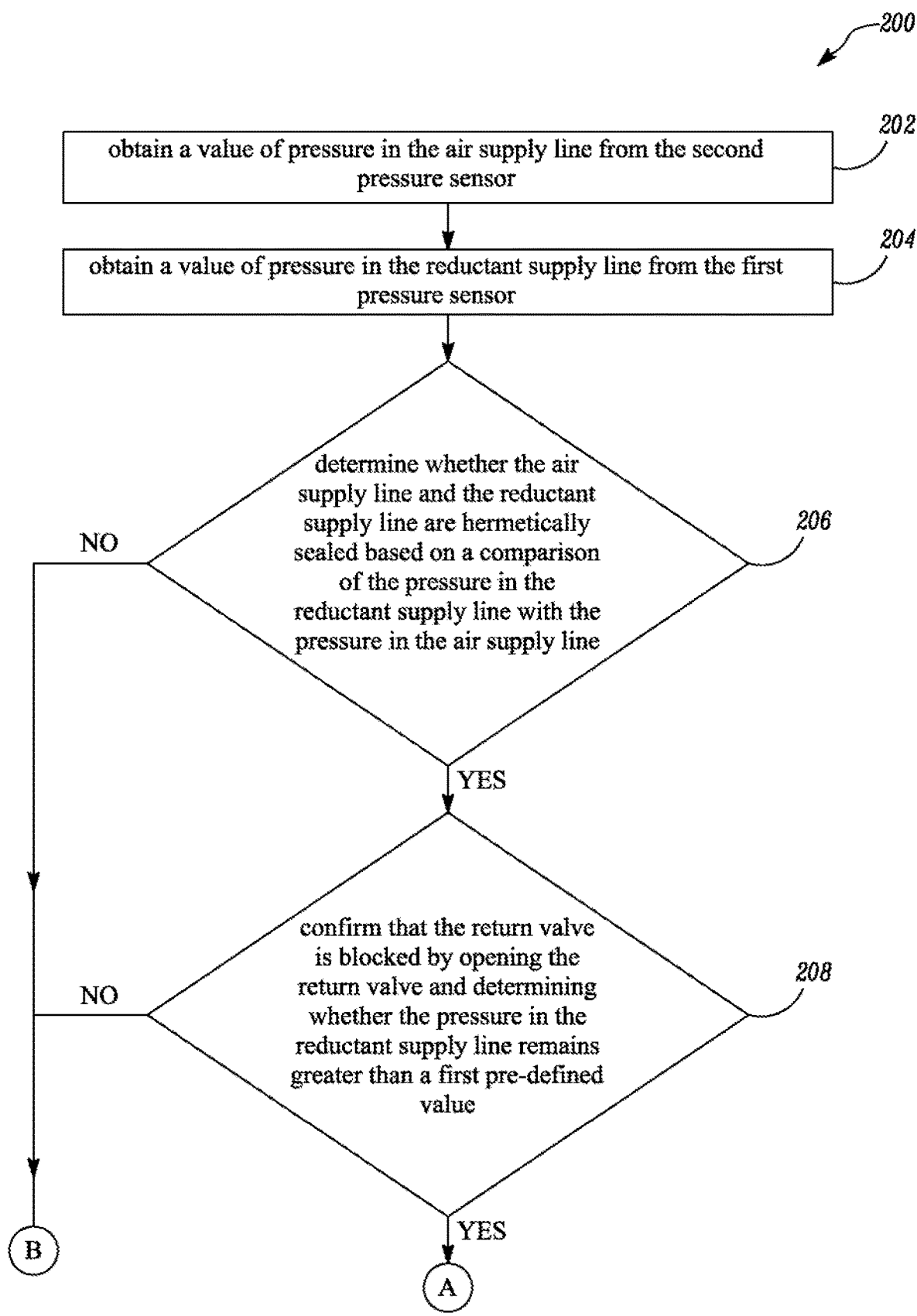
FIG. 2A is a flowchart depicting a method for flushing a return valve associated with a reductant supply circuit of the reductant dosing system, in accordance with an embodiment of the present disclosure.
Figure 2B:
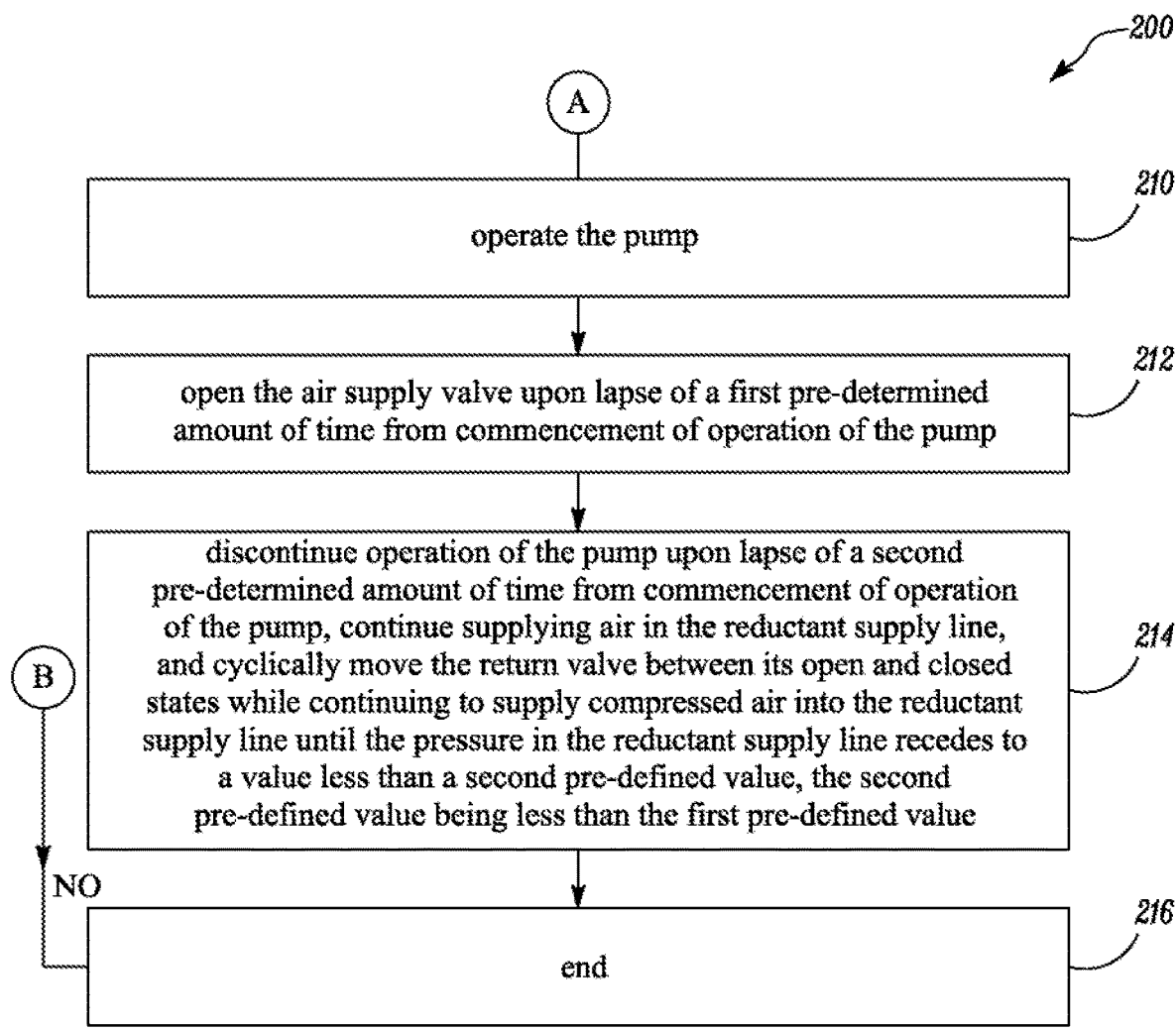
FIG. 2B is a continuation of the method disclosed partly in the flowchart of FIG. 2A.

FIGS. 2A-2B illustrate a method 200 for flushing the return valve 126 associated with the reductant supply circuit 126 of the reductant dosing system 100. As shown in FIG. 2A, the method 200 initiates at step 202 in which the method 200 includes obtaining, using the second pressure sensor 136, the amount of pressure associated with the air supply line 132 of the air supply circuit 108. At step 204, the method 200 includes obtaining, using the first pressure sensor 124, the amount of pressure associated with the first reductant supply line 116 of the reductant supply circuit 106. At step 206, the method 200 includes comparing the pressure associated with the first reductant supply line 116 with the pressure associated with the air supply line 132.

At step 206, if the pressure in the air supply line 132 and the pressure in the first reductant supply line 116 are suggestive to the controller 138 that the air supply line 132 and the first reductant supply line 116 are hermetically sealed, then the method 200 proceeds from step 206 to step 208 in which the controller 138 closes the air supply valve 134 and the mixing chamber 140 of the reductant dosing injector 140, and opens the return valve 126 to determine whether the pressure associated with the first reductant supply line 116 recedes to a value less than the first pre-defined value, if at step 208, the controller 138 determines that the pressure associated with the first reductant supply line 116 does not recede to a value less than the first pre-defined value, then the controller 138 confirms that the return valve 126 is blocked.

Upon confirming that the return valve 126 is blocked, the method 200 proceeds from step 208 to step 210, as shown in FIG. 2B, in which the controller 138 operates the pump 114. Upon lapse of the first pre-determined amount of time, the method 200 proceeds from step 210 to step 212 in which the controller 138 opens the air supply valve 134. Upon lapse of the second pre-determined amount of time, the method 200 proceeds from step 212 to step 214 in which the controller 138 discontinues operation of the pump 114 and while continuing to maintain the air supply valve 134 in the open position, the controller 138 actuates the return valve 126 to cycle between its open and closed states until a pressure in the first reductant supply line 116 recedes to a value below the second pre-defined value.

If at step 214, the controller 138 determines that the pressure in the first reductant supply line 116 recedes to a value below the second pre-defined value, the method 200 proceeds from step 214 to step 216 in which the method 200 terminates by returning the reductant dosing system 100 to a normally operational mode in which the controller 138 is now capable of issuing appropriate commands to one or more specific system hardware of the reductant dosing system 100 for supplying pressurized reductant from the first reservoir 112 to the reductant dosing injector 118.

Also, it may be noted that in embodiments herein, if at step 208 shown in FIG. 2A, the controller 138 determines that the pressure associated with the first reductant supply line 116 has receded to a value that is less than the first pre-defined value, then the method 200 proceeds directly from step 208 to step 216 shown in FIG. 2B where the method 200 terminates and the reductant dosing system 100 is returned to its normally operational mode disclosed earlier herein.

INDUSTRIAL APPLICABILITY

During operation of a reductant dosing system, or if the reductant dosing system has not been operated for a prolonged period of time, a return valve disposed in a return line of the reductant dosing system may become clogged owing to a tendency of the unused reductant to crystallize at orifices of the return valve.

With implementation of embodiments disclosed herein, the controller 138 may help pro-actively flush and hence, unclog the return valve 126 of any unused and crystallized reductant. As the controller 138 renders the reductant dosing system 100 in a flush state of operation, the controller 138 may ensure that the return valve 126 is free from blockage before commencing a normally operational state of the reductant dosing system 100 in which the reductant dosing injector 118 is ready for injecting the drawn reductant fluid into the exhaust after-treatment system 102.

With use of embodiments disclosed herein, frequent service or maintenance that was previously required to unclog the return valve may be mitigated thereby minimizing any manual intervention even if the unused reductant has crystallized at orifices of the return valve. The controller 138 disclosed herein is configured to help the reductant dosing system 100 to unclog the clogged return valve whenever orifices of the return valve become clogged with unused and crystallized reductant. Therefore, the control system 100 may offset an amount of time, effort, and cost that were typically associated with carrying out service or maintenance of previously known reductant dosing systems, due to crystallized reductant clogging the return valve of such previously known reductant dosing systems.

The control system 110 of the present disclosure actively maintains the reductant dosing system 100 ready for use by flushing unused reductant that has crystallized at the return valve of the reductant dosing system 100. Consequently, the control system 100 may improve a reliability of the reductant dosing system 100 in use.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for a reductant dosing system having a reductant supply circuit and an air supply circuit, the control system comprising:
a controller in communication with a pump, a return valve and a first pressure sensor of the reductant supply circuit, and a second pressure sensor and an air supply valve of the air supply circuit, the controller configured to:
obtain a value of pressure in an air supply line of the air supply circuit from the second pressure sensor,
obtain a value of pressure in a reductant supply line of the reductant supply circuit from the first pressure sensor,
compare the pressure in the reductant supply line with the pressure in the air supply line,
close the air supply valve and open the return valve,
determine whether the pressure in the reductant supply line is greater than a first pre-defined value,
operate the pump,
open the air supply valve upon lapse of a first pre-determined amount of time from commencement of operation of the pump,
discontinue operation of the pump upon lapse of a second pre-determined amount of time from commencement of operation of the pump, the second pre-determined amount of time being greater than the first pre-determined amount of time, and
cycle the return valve between its open and closed states while continuing to supply compressed air into the reductant supply line via the opened air supply valve until the pressure in the reductant supply line recedes to a value less than a second pre-defined value, the second pre-defined value being less than the first pre-defined value.

2. The control system of claim 1, wherein the reductant supply circuit of the reductant dosing system further comprises:
a first reservoir located upstream of the pump and fluidly coupled to the pump with a first reductant supply line, the first reservoir configured to store a first volume of reductant therein;
a reductant dosing injector located downstream of the pump and disposed at fluid communication with the pump;
a first check valve disposed in the first reductant supply line and located between the pump and the reductant dosing injector, the first check valve configured to allow a unidirectional flow of reductant from the pump to the reductant dosing injector; and
the return valve, the return valve being disposed in a return line that is configured to branch-off from a point on the first reductant supply line located between the first check valve and the reductant dosing injector and fluidly coupled to the first reservoir downstream of the return valve.

3. The control system of claim 2, wherein the first pressure sensor is located between the first check valve and the reductant dosing injector, the first pressure sensor configured to output a value indicative of pressure in the first reductant supply line between the first check valve and the reductant dosing injector.

4. The control system of claim 2, wherein the reductant dosing system comprises:
a second reservoir disposed in a second reductant supply line fluidly coupled to the return line located between the return valve and the first reservoir;

a transfer pump disposed in the second reductant supply line and configured to output pressurized flow of reductant from the second reservoir into the second reductant supply line; and a reductant transfer valve disposed in the second reductant supply line and located between the transfer pump and the return line, wherein each of the transfer pump and the reductant transfer valve is disposed in communication with the controller.

5. The control system of claim 4, wherein the controller is configured to open the reductant transfer valve in response to an amount of reductant in the first reservoir being below a first pre-defined threshold value.

6. The control system of claim 5, wherein each of the return valve, the air supply valve, and the reductant transfer valve is an electromechanically actuated one-way two-position valve.

7. The control system of claim 1, wherein the air supply circuit comprises:

a source configured to provide a supply of pressurized air to the reductant dosing injector via the air supply line, wherein the air supply valve is disposed in the air supply line and located downstream of the source, the air supply valve being configured to allow a unidirectional flow of air from the source to the reductant dosing injector.

8. The control system of claim 7, wherein the second pressure sensor is located between the air supply valve and the reductant dosing injector, the second pressure sensor being configured to output a value indicative of an amount of pressure in the air supply line.

9. The control system of claim 1, wherein in response to the pressure in the first reductant supply line being greater than the first pre-defined value, the controller is configured to:

determine whether the return valve is in a closed-state, and if so:

open the return valve.

10. The control system of claim 1, wherein in response to opening the return valve, the controller is configured to determine if the pressure in the first reductant supply line continues to be greater than the first pre-defined value.

11. A reductant dosing system comprising:

a first reservoir configured to store reductant therein;

a pump fluidly coupled to the reservoir via a first reductant supply line;

a reductant dosing injector disposed in fluid communication with the pump;

a first pressure sensor configured to output a value indicative of pressure in the first reductant supply line; and a return valve disposed in a return line and positioned between the pump and the reductant dosing injector and fluidly coupled to the first reservoir downstream of the return valve;

a supply of pressurized air connected to the reductant dosing injector via an air supply line;

an air supply valve disposed in the air supply line and configured to selectively allow flow of air from the source to the reductant dosing injector;

a second pressure sensor located between the air supply valve and the reductant dosing injector, the second pressure sensor configured to output a value indicative of pressure in the air supply line; and a controller communicably coupled to the pump, the first pressure sensor, the second pressure sensor, the return valve, and the air supply valve, the controller configured to:

obtain a value of pressure in the air supply line from the second pressure sensor, obtain a value of pressure in the reductant supply line from the first pressure sensor, compare the pressure in the reductant supply line with the pressure in the air supply line, close the air supply valve and open the return valve, determine whether the pressure in the reductant supply line is greater than a first pre-defined value, operate the pump, open the air supply valve upon lapse of a first pre-determined amount of time, discontinue operation of the pump upon lapse of a second pre-determined amount of time, and cycle the return valve between its open and closed states while continuing to supply compressed air into the reductant supply line via the opened air supply valve until the pressure in the reductant supply line recedes to a value less than a second pre-defined value, the second pre-defined value being less than the first pre-defined value.

12. The reductant dosing system of claim 11 further comprising:

a second reservoir disposed in a second reductant supply line fluidly coupled to the return line located between the return valve and the first reservoir;

a transfer pump disposed in the second reductant supply line and configured to output pressurized flow of reductant from the second reservoir into the second reductant supply line; and a reductant transfer valve disposed in the second reductant supply line and located between the transfer pump and the return line, wherein each of the transfer pump and the reductant transfer valve is disposed in communication with the controller.

13. The reductant dosing system of claim 12, wherein the controller is configured to selectively open the reductant transfer valve in response to an amount of reductant in the first reservoir being below a first pre-defined threshold value.

14. The reductant dosing system of claim 12, wherein each of the return valve, the air supply valve, and the reductant transfer valve is an electromechanically actuated one-way two-position valve.

15. The reductant dosing system of claim 11, wherein in response to the pressure in the first reductant supply line being greater than the first pre-defined value, the controller is configured to:

determine whether the return valve is in a closed-state, and if so:

open the return valve.

16. The reductant dosing system of claim 11, wherein in response to opening the return valve, the controller is configured to determine if the pressure in the first reductant supply line continues to be greater than the first pre-defined value.

* * * * *